(12) United States Patent
Chung

(10) Patent No.: US 9,377,083 B2
(45) Date of Patent: Jun. 28, 2016

(54) MULTIPLE-OUTPUT TRANSMISSION

(71) Applicant: Caleb Chung, Boise, ID (US)

(72) Inventor: Caleb Chung, Boise, ID (US)

( * ) Notice: Subject to any disclaimer, the term of this patent is extended or adjusted under 35 U.S.C. 154(b) by 0 days.

(21) Appl. No.: 14/288,718

(22) Filed: May 28, 2014

(65) Prior Publication Data

US 2014/0352493 A1 Dec. 4, 2014

Related U.S. Application Data

(60) Provisional application No. 61/828,125, filed on May 28, 2013.

(51) Int. Cl.
*F16H 37/06* (2006.01)
*F16H 1/22* (2006.01)

(52) U.S. Cl.
CPC .............. *F16H 1/22* (2013.01); *F16H 37/065* (2013.01); *Y10T 74/14* (2015.01); *Y10T 74/1488* (2015.01)

(58) Field of Classification Search
None
See application file for complete search history.

(56) References Cited

U.S. PATENT DOCUMENTS

| | | | |
|---|---|---|---|
| 3,686,974 A * | 8/1972 | Little, Jr. | 74/665 GA |
| 4,295,380 A | 10/1981 | Muhling et al. | |
| 5,094,116 A * | 3/1992 | Shintani | F16H 3/34 475/5 |
| 6,304,002 B1 | 10/2001 | Dehlsen et al. | |
| 6,537,168 B1 | 3/2003 | Han | |
| 6,732,603 B1 * | 5/2004 | Hsu et al. | 74/354 |
| 7,128,680 B2 | 10/2006 | Holmes | |
| 7,313,982 B2 | 1/2008 | Wisner et al. | |
| 2003/0177862 A1 | 9/2003 | Chan | |
| 2004/0237683 A1 | 12/2004 | Mikhail et al. | |
| 2005/0150326 A1 | 7/2005 | Daniel | |
| 2006/0011005 A1 | 1/2006 | Wisner et al. | |
| 2008/0000322 A1 | 1/2008 | Hillyer et al. | |
| 2008/0034908 A1 | 2/2008 | Bayer et al. | |
| 2009/0224574 A1 | 9/2009 | Rikkert | |
| 2011/0175474 A1 | 7/2011 | Brown et al. | |
| 2011/0278125 A1 | 11/2011 | Chevalier | |
| 2011/0296948 A1 | 12/2011 | Yoshimi et al. | |
| 2012/0144943 A1 | 6/2012 | Shigematsu et al. | |
| 2012/0160056 A1 | 6/2012 | Wrong | |
| 2012/0319445 A1 | 12/2012 | Zolno et al. | |

OTHER PUBLICATIONS

Patent Cooperation Treaty; International Search Report and Written Opinion for PCT/US2014/039803 dated Oct. 9, 2014.

* cited by examiner

*Primary Examiner* — Erin D Bishop

(74) *Attorney, Agent, or Firm* — Parsons Behle & Latimer

(57) ABSTRACT

A multiple-output transmission includes a drive motor and one or more stacked layers. Each layer includes one or more output gears, a drive gear, coupled to be driven by the drive motor, at least one idler gear, engageable with the drive gear, and means for indexing the at least one idler gear between multiple selectable indexing positions, thereby to selectively engage one or more of the output gears.

22 Claims, 13 Drawing Sheets

MULTIPLE-OUTPUT TRANSMISSION

PRIORITY CLAIM

The present application claims the benefit of U.S. Provisional Patent Application Ser. No. 61/828,125, filed May 28, 2013, and entitled MULTIPLE-OUTPUT TRANSMISSION, the disclosure of which is incorporated by reference herein in its entirety.

FIELD OF THE DISCLOSURE

The present application relates generally to mechanical transmissions. More particularly, the present disclosure relates to a multiple output transmission that can drive and select multiple outputs.

BACKGROUND

There are a variety of types of machines that produce and transmit rotational energy from an input shaft to an output shaft, in order to do work. A gearbox comprising a single motor driving a single output is well known and frequently used in such machines. Sometimes it is desirable to allow a single input shaft to selectively drive more than one output shaft. In such cases an electronically-driven or human-driven gearbox can be provided to allow shifting the motive power from one output to another. That is, a gearbox can allow a single rotating shaft to be selectively connected to one or more output shafts, with a selected gear ratio and direction, to give a desired rotational speed, torque and direction of rotation that can be unique for each output shaft.

A gearbox with multiple selectable outputs can be useful in connection with a wide variety of devices, from large industrial machinery to small hand-held tools and toys. However, multi-output transmissions can be large, complicated and costly. The present disclosure is directed toward one or more of the above-referenced issues.

SUMMARY

It has been recognized that it would be advantageous to develop a multiple-output transmission that can drive and select multiple output shafts individually or in a plurality of combinations.

It has also been recognized that it would be advantageous to develop a multiple-output transmission that is smaller, simpler and less costly than many multiple output transmissions that are known.

In accordance with one embodiment thereof, the present disclosure provides a multiple-output transmission, having a first turning mechanism, adapted to rotate about a first axis, a first drive gear, disposed adjacent to the first turning mechanism and adapted to rotate about a second axis that is at least parallel to the first axis, and a drive motor, configured to drive the first drive gear. A first idler gear is rotatably disposed upon the first turning mechanism and configured to engage with the first drive gear, and a plurality of first output gears are positioned to engage with the first idler gear when the first turning mechanism rotates to one of multiple selectable indexing positions. An indexing mechanism is configured to selectively rotate the first turning mechanism between the indexing positions.

In accordance with a more detailed embodiment thereof, the indexing mechanism includes an indexing gear, engaged to rotate the turning mechanism, and an indexing motor, engaged with the indexing gear, configured to selectively rotate the indexing gear.

In accordance with another more detailed embodiment thereof, the indexing mechanism includes an indexing gear, engaged to rotate the first turning mechanism, a pivot arm, attached to a drive shaft of the drive motor adjacent to the first turning mechanism, and a moveable gear, attached to the pivot arm and engaged with the drive motor. The pivot arm is rotatable between a first position in which the moveable gear is engaged to drive the first drive gear, and a second position in which the moveable gear is engaged with the indexing gear to rotate the turning mechanism.

In accordance with yet another more detailed embodiment thereof, the idler gears are vertically indexed, whereby selected first idler gears can have a no-contact overlapping relationship with an adjacent first idler gear.

In accordance with another embodiment thereof, the present disclosure provides a multiple-output transmission having a plurality of turntables, disposed substantially parallel to each other in a stacked relationship, each turntable adapted to rotate about a common first axis, a plurality of drive gears, each drive gear coaxially positioned adjacent to one of the plurality of turntables, and a drive motor, configured to simultaneously drive the plurality drive gears. A plurality of idler gears are provided, at least one idler gear being rotatably supported by each of the turntables and engageable with the respective drive gear. A plurality of output gears are also provided, at least one output gear being positioned to engage with an idler gear of one of the turntables when the respective turntable rotates to one of multiple selectable indexing positions. An indexing mechanism is configured to selectively simultaneously rotate the turntables between the indexing positions.

In accordance with yet another embodiment thereof, the present disclosure provides a multiple-output transmission having a drive motor and one or more stacked layers. Each layer includes one or more output gears, a drive gear, coupled to be driven by the drive motor, at least one idler gear, engageable with the drive gear, and means for indexing the at least one idler gear between multiple selectable indexing positions, thereby to selectively engage one or more of the output gears.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

Figure 1A:
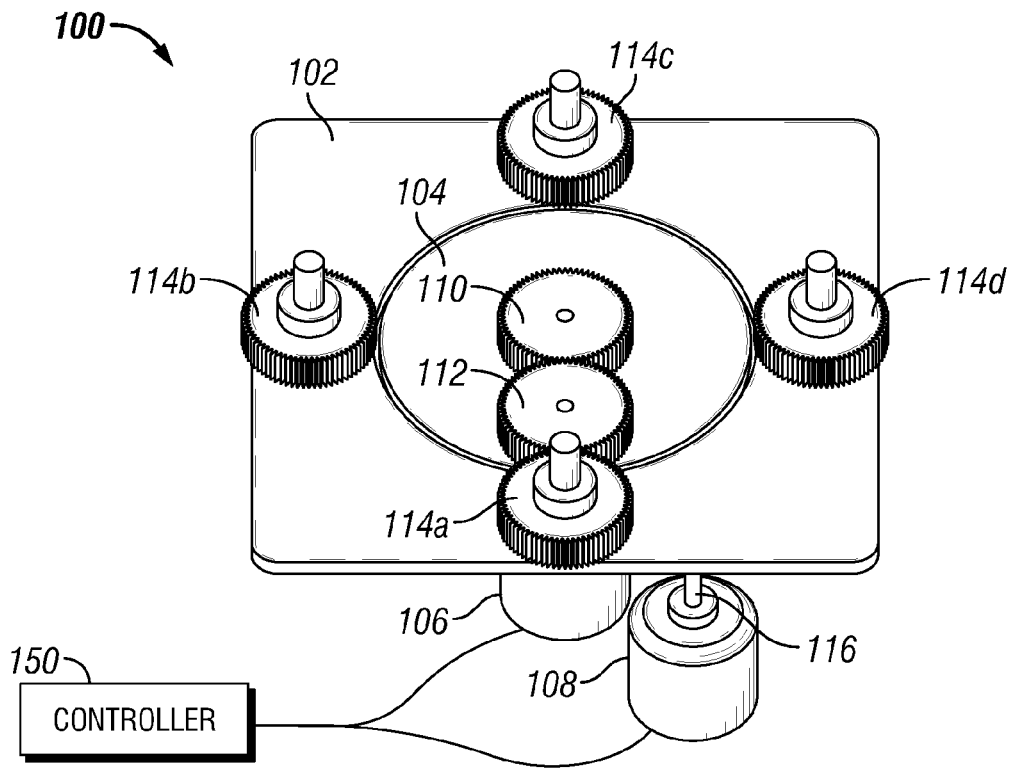
FIG. 1A is a top perspective view of an embodiment of a 2 motor input, multi-output indexing transmission having four output gears.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In the following description, unless otherwise indicated, directional terms, such as above, below, up, down, etc. are with reference to the orientation of structure shown in the figures, and do not necessarily represent fixed directions with respect to any other reference point. It is to be understood that the multi-output transmission disclosed herein can be positioned and oriented in a wide variety of ways, and is not limited to any particular orientation or configuration.

As noted above, multi-output transmissions can be large, complicated and costly. Advantageously, the present disclosure provides a multiple-output transmission that can drive and select multiple output shafts individually or in a plurality of combinations. Additionally, the multiple-output transmission disclosed herein is smaller, simpler and less costly than many other multiple output transmissions that are known. This device that can also reduce the overall motor count in a multi-output device, thereby reducing weight, cost and space.

In various embodiments shown and described herein, the multi-output transmission utilizes either one or two motors to both drive and select multiple outputs in a planetary gear system. In addition, the multi-output transmission disclosed herein allows for driving the output shafts individually or in a plurality of combinations. In one embodiment, each motor (e.g. a DC electric motor) is controlled for forward and reverse operation by a microprocessor with accompanying software. Each motor can have electronic feedback providing positional and/or rotational data to a microprocessor controller, for example. This feedback can be used for general control purposes and for providing a "synchro-mesh" function that improves smooth operation when indexing between gear positions. In one embodiment, the rotational table, once positioned by the turntable motor, is held in position until it is repositioned to a new rotational location. This can be accomplished by mechanical means, such as a non-back-drivable gear train utilizing a worm or screw type drive, discussed below.

Figure 1B:
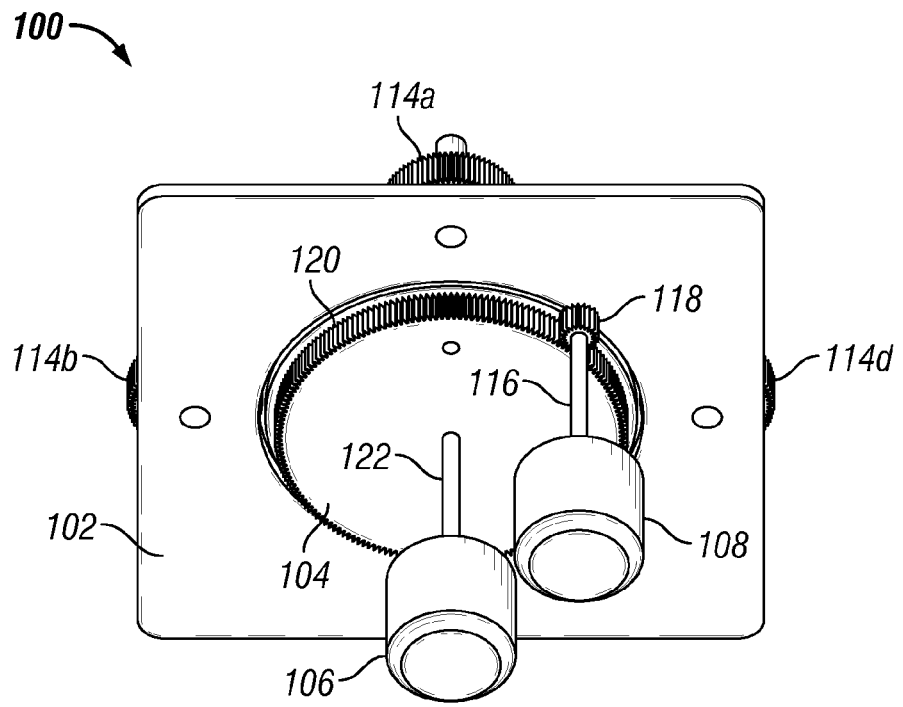
FIG. 1B is a bottom perspective view of the multi-output indexing transmission of FIG. 1A.

FIGS. 1A and 1B show top and bottom perspective views of one embodiment of a 2-motor multi-output indexing transmission 100. Viewing FIGS. 1A and 1B, the transmission 100 generally includes a base 102, a turntable 104, a drive motor 106, an indexing motor 108, a drive gear 110, rotatably mounted on the turntable 104, an idler gear 112, also rotatably mounted on the turntable 104, and first through fourth output gears 114a-114d, which are rotatably mounted to the base 102. The drive motor 106 has a drive shaft 122 that extends through the center of the turntable 104 and powers the drive gear 110. This gear train provides a planetary gear arrangement, with a sun gear and at least one planet gear. The drive gear 110 is equivalent to a sun gear, and the idler gear 112 and output gears 114 are equivalent to planetary gears.

As can be seen in FIG. 1B, the indexing motor 108 includes a drive shaft 116 with an indexing drive gear or pinion gear 118 that is engaged with external gear teeth 120 of the turntable 104. This configuration allows the indexing motor 108 to determine the position of the turntable 104, to allow selective engagement of the output gears 114, as discussed below. The indexing motor 108 can be configured to operate in both forward and reverse directions, and allows rotational indexing of the turntable to any desired number of specific rotational points. This allows indexing of the planetary gear system to any desired position using the pinion gear 118, without the use of other more complicated mechanisms, such as a Geneva wheel or the like. The turntable 104, once positioned by the indexing motor 108, can be held in position until it is repositioned to a new rotational location.

The drive motor 106 and indexing motor 108 can be DC electric motors, and are coupled to a controller 150, which can be configured to control the forward and reverse operation of the motors. The controller 150 can be a computer device having a microprocessor and system memory, which is provided with software for allowing control of the motors in a variety of ways. Various sensors and other input devices, including devices for user input and control, can be coupled to the controller 150 to allow desired operation. For example, each motor 106, 108 can include electronic feedback or sensor devices that provide positional and/or rotational data from the respective motor to the controller 150. Motors having rotational sensors is shown and described below with respect to FIG. 5.

Figure 6:
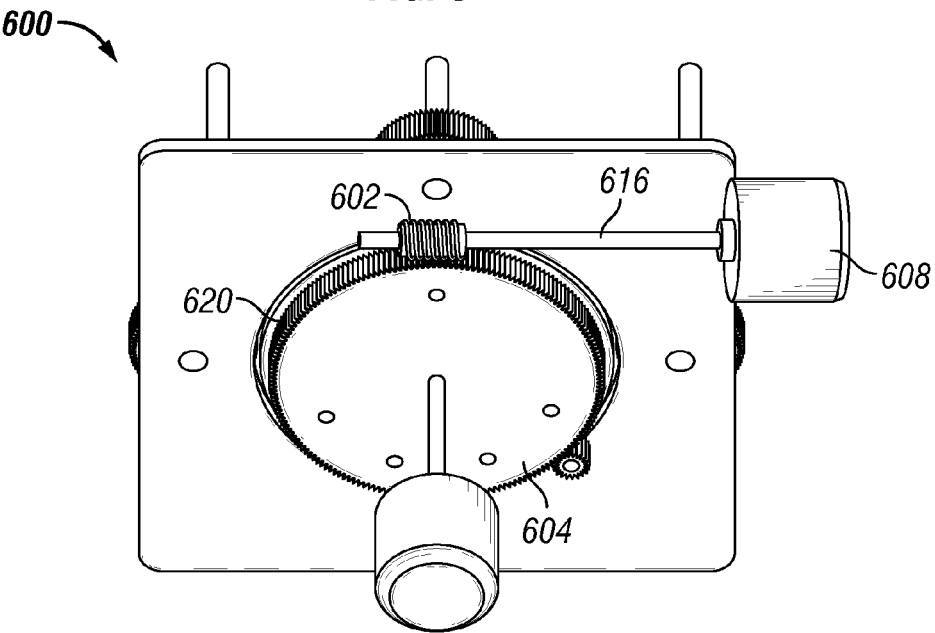
FIG. 6 is a bottom perspective view of a multi-output indexing transmission having a worm drive.

There are a variety of mechanisms that can be employed to prevent backward or undesired rotation of the turntable. One configuration for driving and holding a turntable like that shown in FIGS. 1A and 1B is shown in FIG. 6. In this embodiment of a multi-output indexing transmission 600, a worm gear 602 is engaged with the gear teeth 620 of the turntable 604, and is attached to the output shaft 616 of an indexing motor 608. When the indexing motor 608 turns the worm gear 602, it rotates the turntable 604. When the worm gear 602 stops rotating, it holds the turntable 604 in place and resists undesired rotation of the turntable 604 in either direction. If a force is applied to the turntable 604 (e.g. by hand or by some other means) that force will be resisted because the worm gear 602 substantially prevents rotation of the turntable 604. It is extremely difficult to turn the worm 602 gear by rotating the turntable 604 because the pitch of the worm gear 602 is comparatively steep. This configuration effectively provides a non-backdrivable gear train.

Though not shown, it is to be appreciated that other types of non-backdrivable mechanisms can also be used for the turntable, and such mechanisms can also be associated with any of the output gears (e.g. gears 114 in FIGS. 1A-1E). These can include ratchet-type mechanisms or clutches (either bi-directional or unidirectional). For example, referring again to FIGS. 1A-1E, a non-backdrivable mechanism (not shown) can be associated with any of the output gears 114 so that if one of the output gears 114 were lifting a weight or holding a load, disengagement of that output gear would not allow it to rotate backward and release the load.

While the embodiment of FIGS. 1A and 1B includes a base or base plate 102, other structures and configurations can also be used. It is to be appreciated that the base 102 functions as a supporting structure for various components of the multi-output indexing transmission 100, such as the output gears 114, and, consequently, other structures that can adequately support these components can be used instead of the base plate 102. For example, one or more frames or frame-type members can be used for supporting the output gears 114, the turntable 104, and other components of the multi-output indexing transmission 100. Indeed, any structure or configuration that adequately supports the various gears and other components in an appropriate working relationship can be used.

It is also to be appreciated that other devices that can perform the function of the turntable 104 can also be used. The turntable 104 is essentially a turning mechanism that supports one or more idler gears 112. Any other suitable turning mechanism that can support the idler gears 112, such as a wheel or turnable frame, can also be used for the same purpose. The location and orientation of the drive motor 106 and indexing motor 108 can also be varied from that shown. For example, either or both of these motors can be positioned on the same side of the turntable 104 as the idler gears 112 and output gears 114. Other configurations can also be used.

Figure 1C:
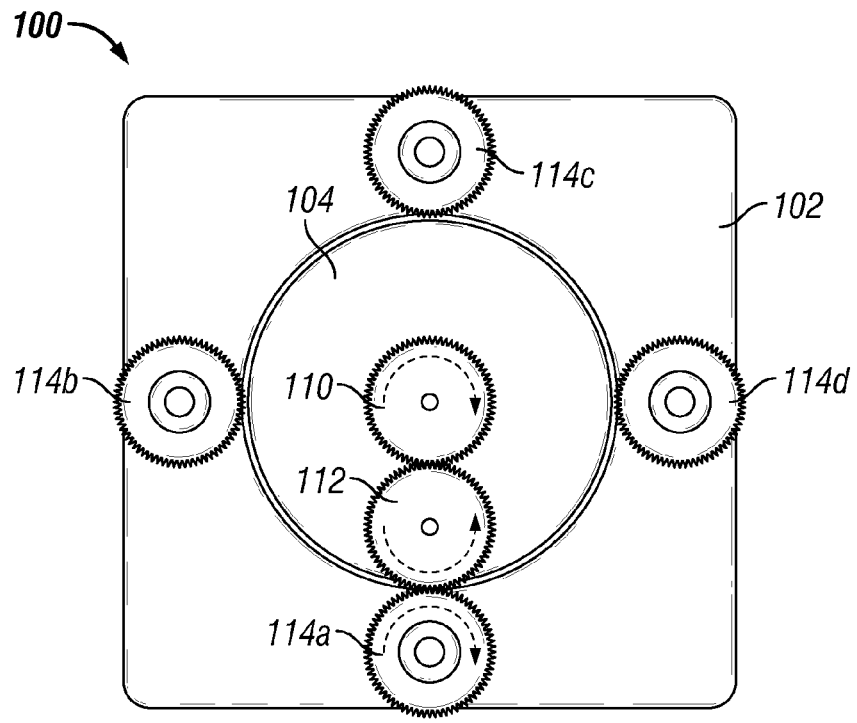
FIGS. 1C-1E are sequential top views that show the 2 motor input, multi-output indexing transmission transitioning from driving a first output gear to driving a second output gear.
Figure 1D:
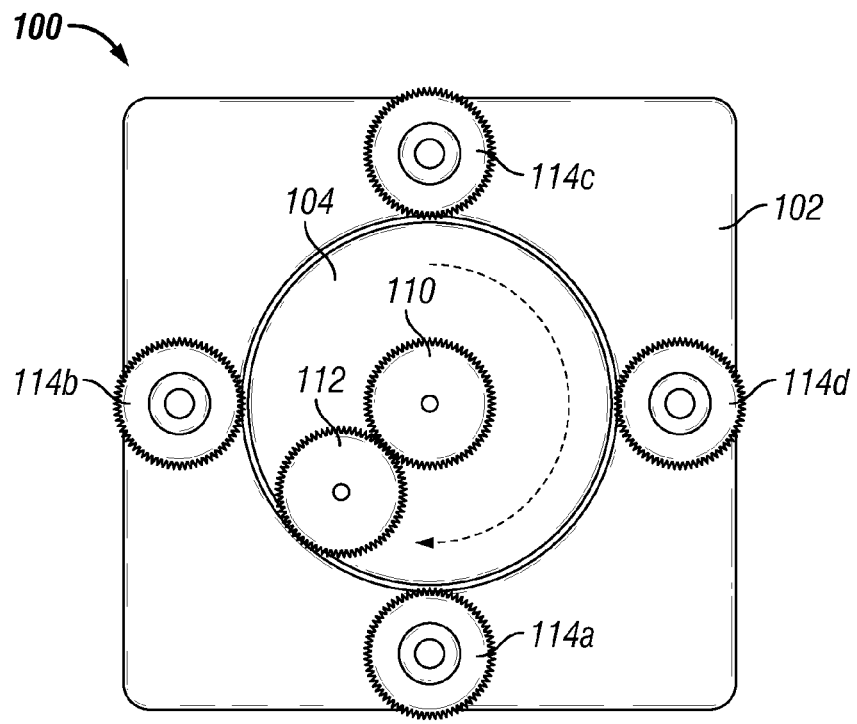
Figure 1E:
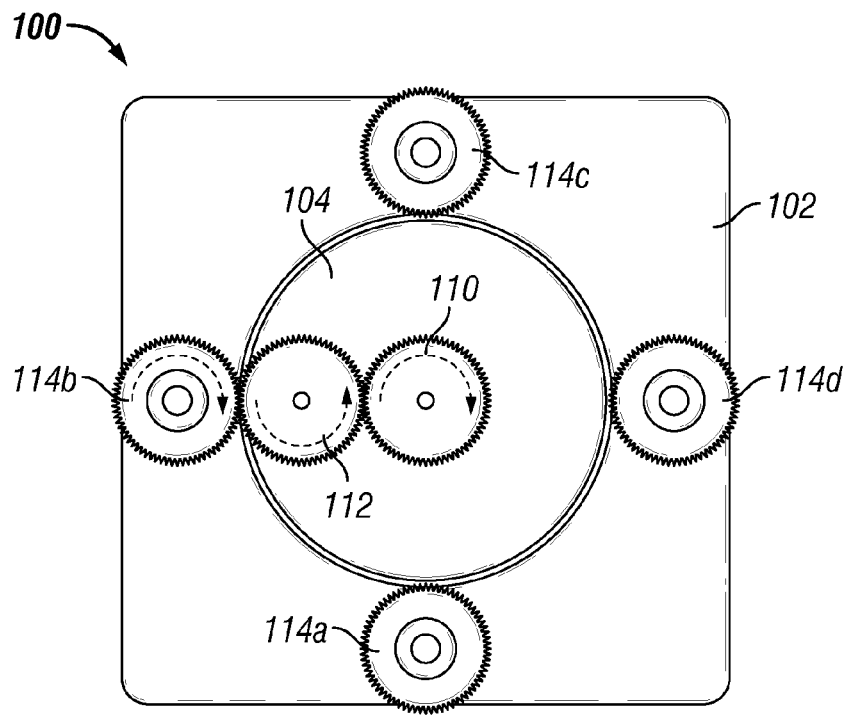

An example of how this multi-output transmission operates is shown in the sequence of views in FIGS. 1C-1E. In the view of FIG. 1C, the drive gear 110 is engaged with the idler gear 112, which is engaged with the first output gear 114a. In this view the drive motor 106 is driving the drive gear 110 clockwise, which causes the idler gear 112 to rotate counterclockwise, and drive the first output gear 114a clockwise. When it is desired to switch the driving output to another one of the output gears 114, the drive motor 106 can stop, and the indexing motor 108 can start and cause the turntable 104 to rotate. As shown in FIG. 1D, the indexing motor 108 can rotate the turntable 104 clockwise, causing the idler gear 112 to disengage and move away from the first output gear 114a, and rotate toward the second output gear 114b. Since the output gears 114 are positioned at a 90° spacing around the turntable 104, the turntable rotates through this angle to obtain the new alignment. After sufficient rotation of the turntable 104, the idler gear 112 lines up with and engages the second output gear 114b, creating a new drive train for the second output gear 114b, as shown in FIG. 1E. In this configuration, the drive motor 106 can again drive the drive gear 110, which causes the idler gear 112 to rotate, and thus drives the second output gear 114b in the desired direction. In this embodiment, the drive gear 110 rotates clockwise, which causes the idler gear 112 to rotate counterclockwise, and thus drives the output gear 114b clockwise.

It is to be appreciated that the direction of rotation of any or all of the various motors and gears is not limited to the operation shown in FIGS. 1C-1E. For example, the drive motor 106 can be configured to rotate either clockwise or counter-clockwise, to provide output rotation in a desired direction. Likewise, the indexing motor 108 can rotate in a different direction than that shown. Further, the motors 106, 108 can be reversible motors for which the direction of rotation can be selected as desired. Thus, for example, if it is desired to switch from driving output gear 114a to driving output gear 114d, the direction of the indexing motor 108 can be selected to cause turntable 104 to rotate counterclockwise, thus reducing the magnitude of rotation involved in establishing the new alignment.

It is also to be appreciated that when the turntable 104 rotates to change alignment of the gear train, it can be caused to rotate past any given output gear 114 on its way to an intended output gear 114. When rotating past output gears in this way, the drive gear 110 can be controlled to provide a sort of "synchro-mesh" operation. That is, while the turntable 104 is rotating, the drive gear 110 can be caused to rotate at a speed (and in a direction) that matches the rotational motion of the turntable 104, so that as the idler gear 112 passes an output gear 114 that is not to be engaged, the teeth of the idler gear 112 will intermesh with the teeth of the respective output gear 114 as the two gears pass each other, but will not cause rotation of that output gear. As the two gears pass, the idler gear 112 will essentially roll past the idler gear 114 that is to be bypassed.

Figure 5:
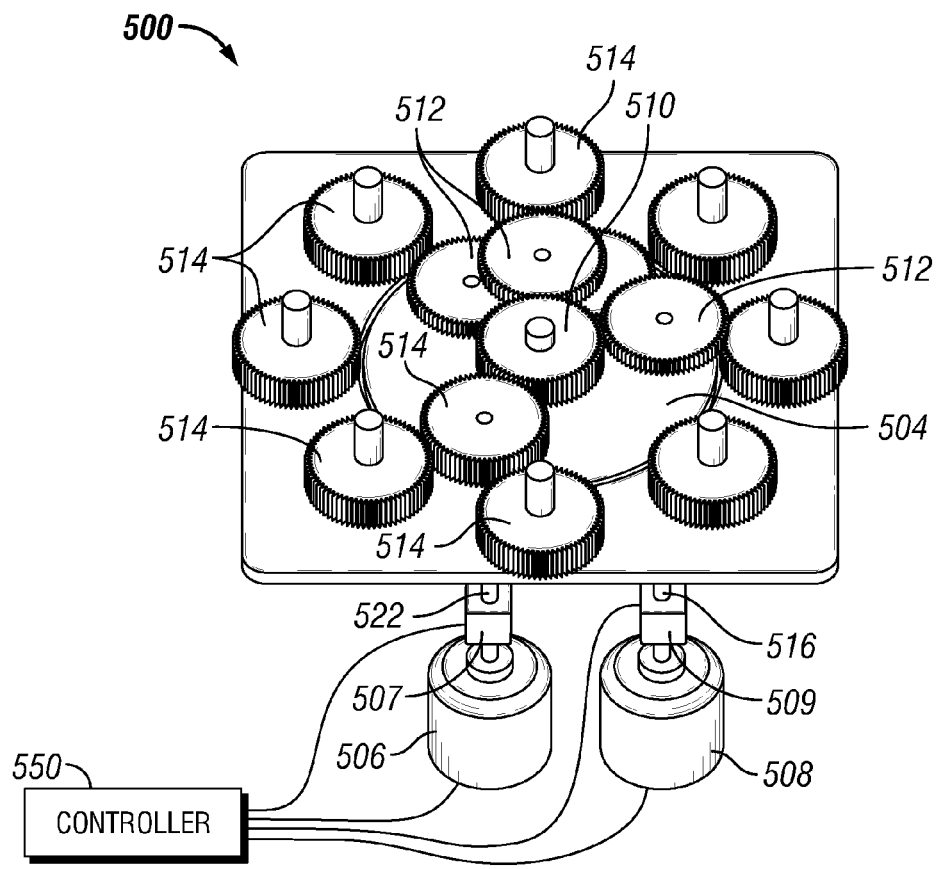
FIG. 5 is a perspective view of another embodiment of a 2 motor input, multi-output indexing transmission having a synchro-mesh indexing configuration.

An embodiment of a 2-motor input, multi-output indexing transmission 500 having a synchro-mesh indexing capability is shown in FIG. 5. In this embodiment, a rotational speed sensor 507 is disposed upon the drive shaft 522 of the drive motor 506. Similarly, a rotational speed sensor 509 is disposed upon the drive shaft 516 of the indexing motor 508. The speed sensors 507, 509 send signals back to a controller 550, which controls the operation of the drive motor 506 and indexing motor 508, respectively. The speed sensors 507, 509 provide positional and/or rotational data from the respective motor to the controller 550.

As the turntable 504 rotates, powered by the indexing motor 508, the controller 550 receives signals from the indexing motor speed sensor 509, and causes the drive motor 506 to rotate the center drive gear 510 in the same direction as the turntable 504 (e.g. clockwise or counter-clockwise, as the case may be) at a speed that allows the idler gears 512 to mesh or "roll over" the teeth of the stationary output gears 514. When the relative rotational speeds of the turntable 504 and idler gears 512 is correct, no rotational torque is applied to the output gears 514 as the turntable 504 rotates, even when adjacent teeth of idler gears 512 and output gears 514 mesh with each other as the respective gears pass.

This synchro-mesh function is controlled by the controller 550, which adjusts the speeds of the motors 506, 508 to achieve the correct rotational ratio. The ratio between the speeds of the indexing motor 508 and the speed needed for the drive gear 510, and thus the idler gears 512, varies depending on the configuration and gear ratios of the system. However, once this speed is determined by the controller 550, it remains constant. This synchro-mesh bypass feature is very helpful in providing smooth operation of the multi-output transmission. It helps to reduce noise and vibration when the multi-output transmission indexes between different output gear positions, and helps prevent tooth-to-tooth jamming of gear teeth. It is also to be understood that the synchro-mesh feature can be associated with other embodiments of the multi-output transmission disclosed herein and in not limited to the embodiment of FIG. 5. In the absence of such a system, the output gears 514 could be driven as the turntable 504 rotates, which could cause undesired contact and jamming of gears during indexing. Other approaches for reducing gear tooth interference and increasing the smoothness of indexing between different positions can also be used, such as changes to the size, shape and spacing of gear teeth on the idler gears 112 and output gears 114.

Figure 2A:
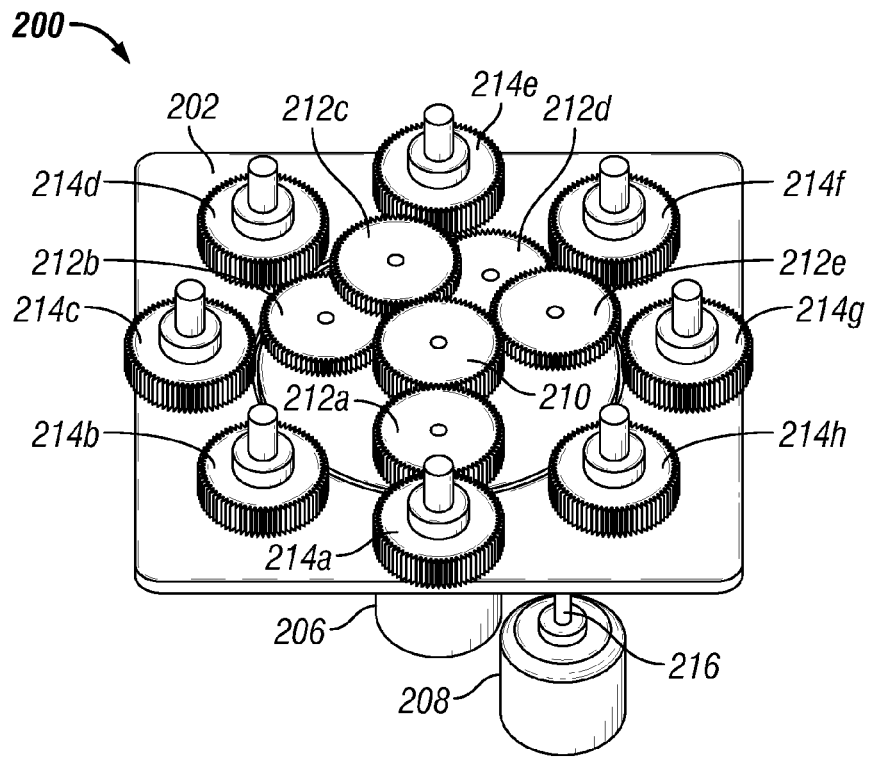
FIG. 2A is a top perspective view of another embodiment of a 2 motor input, multi-output indexing transmission having eight output gears and which utilizes offset indexing.
Figure 2B:
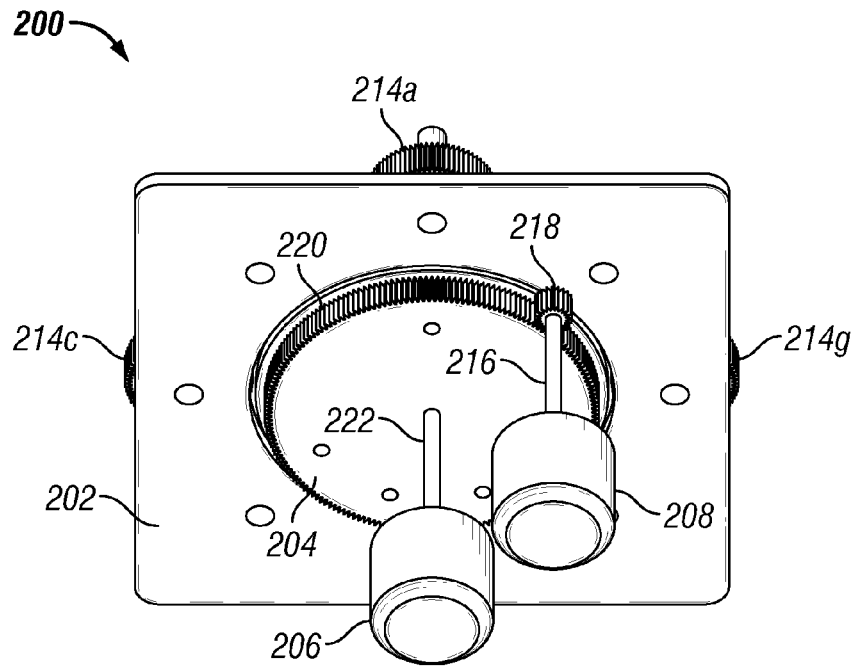
FIG. 2B is a bottom perspective view of the multi-output indexing transmission of FIG. 2A.

The embodiment shown in FIGS. 1A-1E includes a single idler gear 112, and is configured to drive only one of multiple output gears 114 at any given time. Advantageously, the multi-output transmission of the present disclosure can be configured to selectively and/or simultaneously drive multiple output gears in various combinations. Shown in FIGS. 2A-2F is another embodiment of a 2-motor multi-output indexing transmission 200 that uses an offset indexing configuration to drive multiple output gears. Viewing FIGS. 2A and 2B, like the previous embodiment, the transmission 200 generally includes a base 202, a turntable 204, a drive motor 206, an indexing motor 208, and a drive gear 210, rotatably mounted on the turntable 204. As can be seen in FIG. 2B, the indexing motor 208 includes a drive shaft 216 with an indexing drive gear 218 that is engaged with external gear teeth 220 of the turntable 204. This configuration operates like that shown and described with respect to FIGS. 1A and 1B, and allows the indexing motor 208 to determine the position of the turntable 204, to allow selective engagement of the output gears 214. The drive motor 206 has a drive shaft 222 that extends through the center of the turntable 104 and powers the drive gear 210.

The multi-output transmission 200 shown in FIGS. 2A-2E includes eight output gears 214a-214h which are rotatably mounted to the base 202 and arranged in a circle around the turntable 204. Likewise, this transmission 200 includes multiple idler gears 212, which are rotatably mounted on the turntable 204 and engaged with the drive gear 210. These idler gears 212 are vertically indexed—that is, they are placed at multiple levels with respect to a vertical axis and thus rotate in different planes. The vertical indexing of the idler gears 212 places these gears at different vertical positions and allows them to be centered relatively close to each other, so that the perimeter of at least some of the idler gears overlap, but the gears do not interfere with each other. The close spacing allows the idler gears 212 to selectively engage with different combinations of the eight output gears 214, and can allow various settings of the transmission 200 in which some idler gears 212 are engaged and some are not, and some output gears 214 are driven and some are not.

Figure 2C:
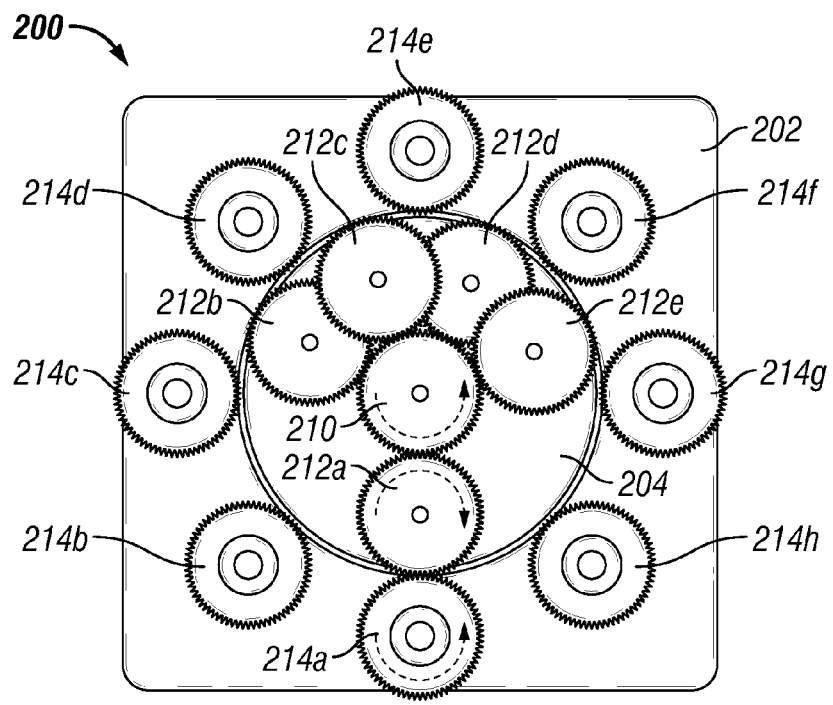
FIGS. 2C-2E are sequential top views that show the 2 motor input, multi-output indexing transmission with offset indexing transitioning from driving a first output gear to driving a group of second output gears.
Figure 2D:
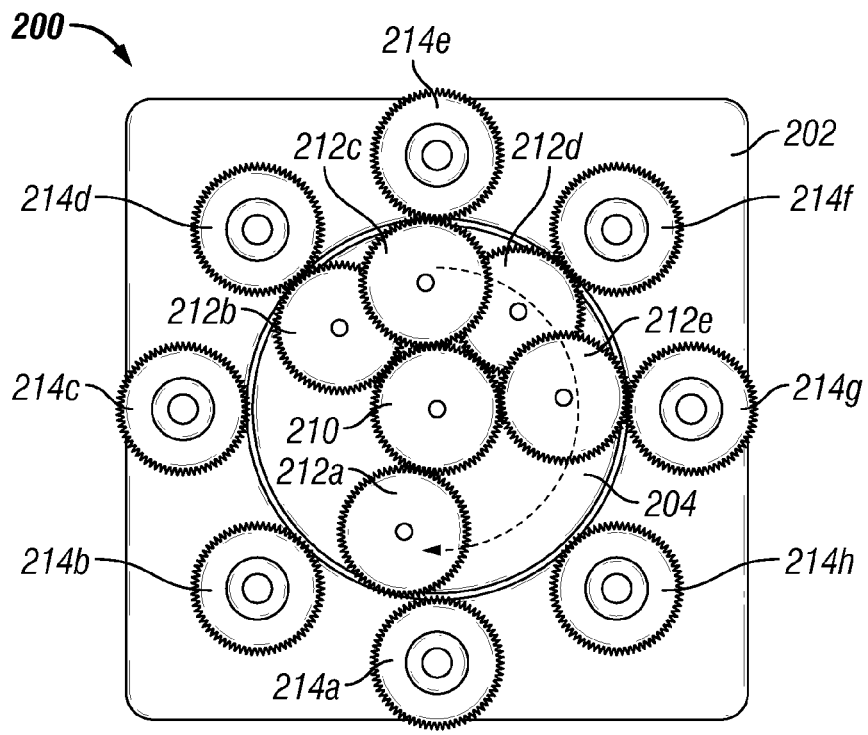
Figure 2E:
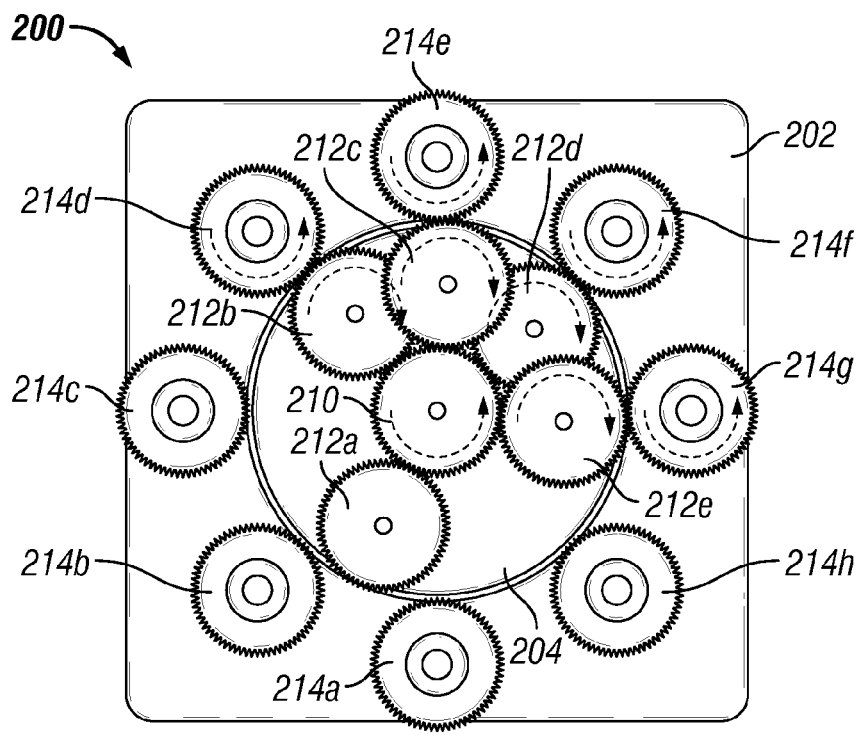

An example of how this multi-output transmission operates is shown in the sequence of views in FIGS. 2C-2E. This multi-output transmission can selectively and/or simultaneously drive multiple output gears in various combinations, thus allowing the device to be selectively adjusted to drive any one of multiple output "chords" or selected groups of gears, somewhat analogous to the way that multiple simultaneous musical notes can produce a musical chord. In the view of FIG. 2C, the drive gear 210 is rotating counter-clockwise and driving all of the idler gears 212 clockwise. However, only the first idler gear 212a is engaged. This first idler 212a is engaged with the first output gear 214a, and driving that gear counter-clockwise. The centers of the remaining idler gears 212b-212e are positioned at intermediate positions, so that in the position of FIG. 2C these gears are not engaged with any of the output gears 214. In this position, the idler gears 212b-212e rotate clockwise, because they are engaged with the drive gear 210, but they are in an idle position and do not transmit any driving power to any output gears 214.

When it is desired to switch the driving output to another one or more of the output gears 214, the drive motor 206 can be stopped, and the indexing motor 208 engaged to cause the turntable 204 to rotate. As shown in FIG. 2D, the indexing motor 208 can rotate the turntable 204 clockwise, causing the first idler gear 212a to disengage and move away from the first output gear 214a, and rotate with all of the idler gears 212 toward another position.

In the embodiment of FIGS. 2A-2E, the output gears are positioned at a 45° spacing around the turntable 204. Moreover, some of the idler gears 212 are positioned to lie between adjacent output gears 214 when other of the idler gears 212 are aligned with other output gears 214. Thus, to move from the position of FIG. 2C to the position of FIG. 2E, the turntable 204 rotates half the angular distance between adjacent output gears 214, or 22.5°. Consequently, only a very small and very brief interruption of power output is caused by switching from one gear alignment to another. Referring to FIG. 2E, after sufficient rotation of the turntable 204, the idler gear 212a moves to an idle position between the first and second output gears 214a and 214b, and the second through fifth idler gears 212b-212e move into alignment with and engage the fourth through seventh output gears 214d-214g, respectively. In this configuration, the drive motor 206 can again drive the drive gear 210, which causes the second through fifth idler gears 212b-212e to drive the fourth through seventh output gears 214d-214g.

As discussed above, the direction of rotation of any or all of the various motors and gears can vary, and any or all of the motors can be reversible. For example, in the configuration of FIG. 2C, the drive motor 206 is rotating counter-clockwise, and providing counter-clockwise output rotation of the output gear 214a. On the other hand, in the configuration of FIG. 2E, the drive motor 206 is rotating clockwise, and providing clockwise output rotation of the fourth through seventh output gears 214d-214g. The indexing motor 208 can also be reversible, as discussed above. This feature can be particularly desirable where, as here, there are multiple output gears 214 and multiple possible positions of the turntable 204 and idler gears 212 for different driving output combinations. With a reversible indexing motor 208, the turntable 204 can be caused to rotate either direction to traverse the smallest angular distance between any two successive gear train positions, which helps reduce the time delay between successive gear engagements.

It is to be appreciated that the number, position and size of the various idler gears 212 and output gears 214 can vary from the configuration shown. For example, while the output gears 214 shown in FIGS. 2A-2E are all the same diameter, where a particular gear ratio is desired for a given output gear 214, the size of that output gear 214 can be selected to provide a different ratio of gear teeth compared to the respective idler gear 212. Alternatively, an additional gear train (not shown) having one or more gears of different sizes can be connected to any given output gear 214, to provide a desired gear ratio. Those of skill in the art will recognize that other alternatives can also be used to provide a desired direction, speed and power of rotation of any combination of output gears 214.

In addition to the offset indexing configuration, a 2-motor, multi-layer indexing transmission in accordance with the present disclosure can also be provided. Such a transmission 300 is shown in FIGS. 3A-3F. This configuration of the planetary drive transmission provides a multiplicity of stacks or layers, with each layer having a ring of output gears arranged around an inner turntable 304. As the turntable 304 rotates, the idler gears 312 positioned at the periphery can be brought into a meshing position with one or more desired output gears 314. The number and sequence of output gears 314 being driven in any position is determined by the number and spacing of the drive gears 310 and turntable gears.

Figure 3A:
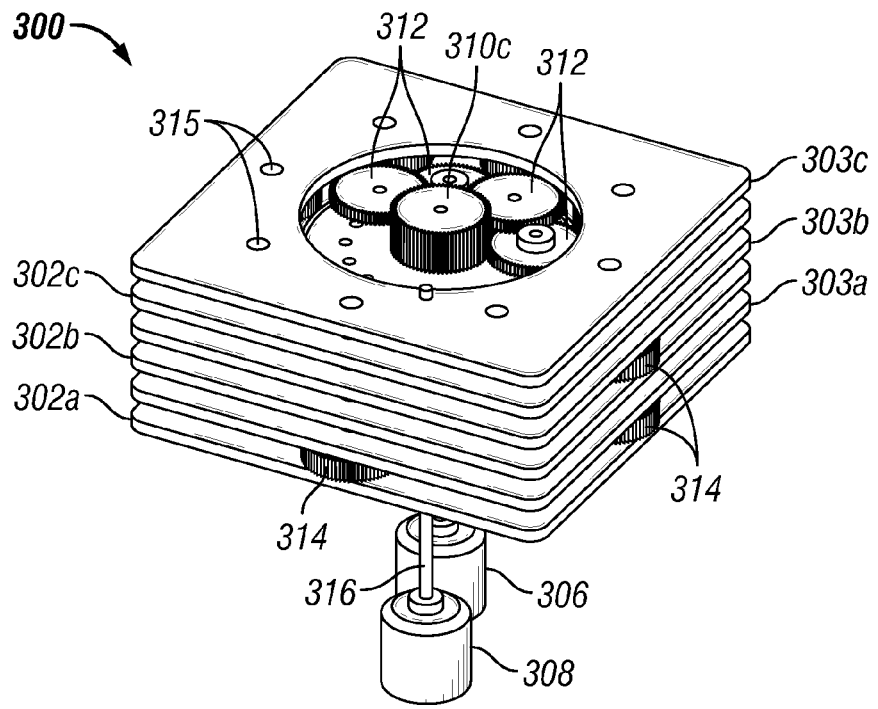
FIG. 3A is a top perspective view of another embodiment of a 2 motor input, multi-output indexing transmission having multiple output gears on multiple layers, and which utilizes offset indexing.
Figure 3B:
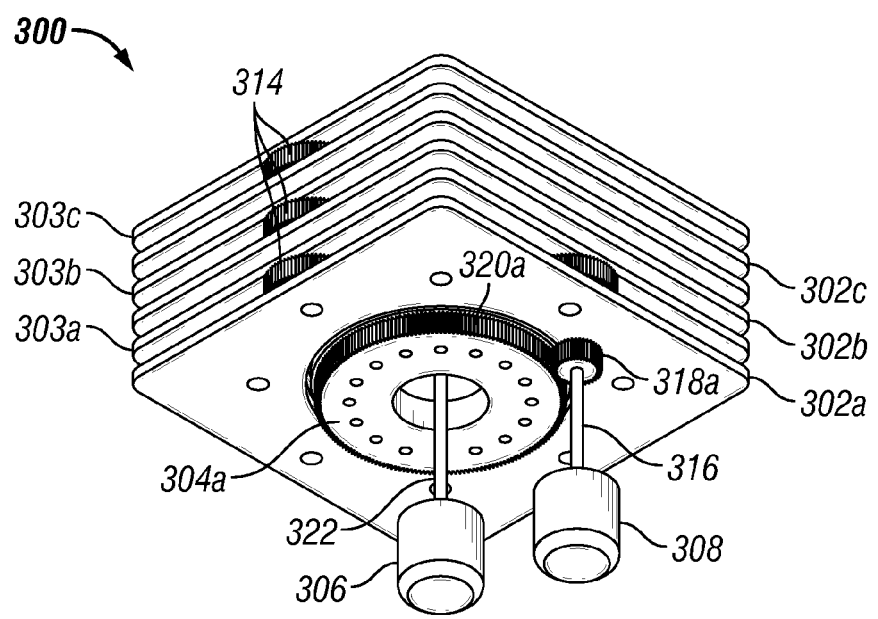
FIG. 3B is a bottom perspective view of the multi-layer multi-output indexing transmission of FIG. 3A.
Figure 3C:
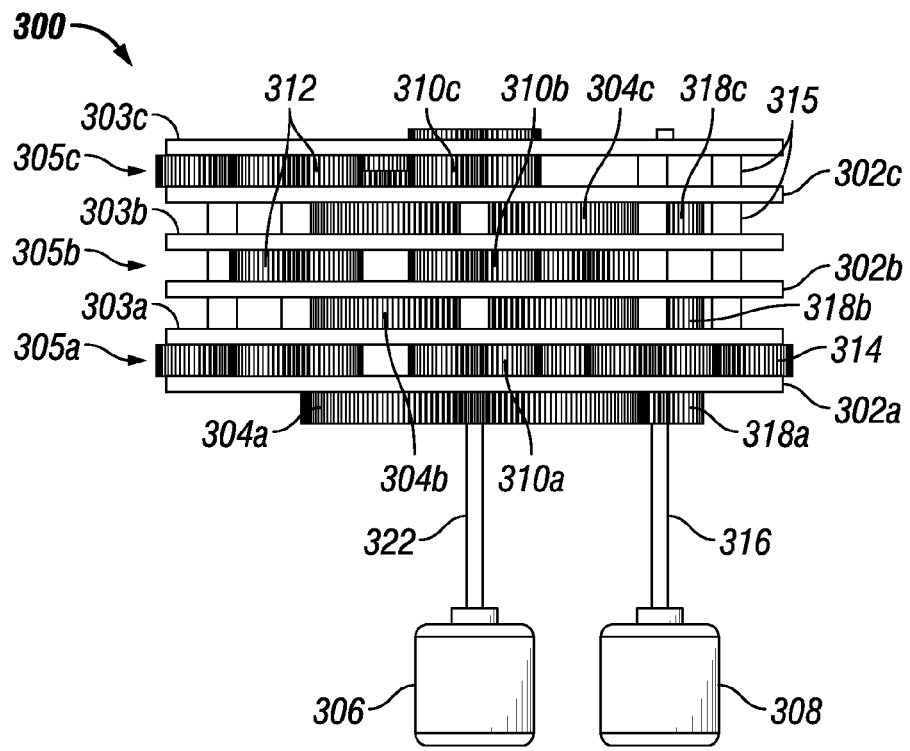
FIG. 3C is a side view of the multi-output indexing transmission of FIG. 3A.

Viewing this embodiment more specifically, the multi-layer transmission 300 generally includes three base plates 302a-302c, with three intermediate plates 303a-303c, positioned one above the other in an alternating stack, as best seen in FIG. 3C. The alternating arrangement provides three transmission layers 305a-305c, each layer 305 including a base plate 302 with a turntable 304 having gear teeth 320 on its outer edge, the turntable extending below the respective base plate 304, and a drive gear 310, one or more idler gears 312 and one or more output gears 314 disposed atop the base plate 304.

As shown in FIGS. 3A-3C, the transmission 300 includes a single drive motor 306 and a single indexing motor 308. As discussed above, the direction of rotation of either or both of the motors can vary, and can be reversible. A central tall drive gear from the drive motor 306 links all of the layers together and drives all the idler gears simultaneously. Specifically, the drive motor 306 has a drive shaft 322 that extends up through the center of all of the turntables 304 and simultaneously powers the drive gear 310 of each layer 305. As can be seen in FIG. 3B, the indexing motor 308 also includes a drive shaft 316 that extends up through all of the base plates 302 and intermediate plates 303, with an indexing gear 318 at each layer 305. The indexing gear 318 of each layer is engaged with the external gear teeth 320 of the respective turntable 304 below the respective base plate 302. This configuration operates like that shown and described with respect to FIGS. 1 and 2, but on multiple layers simultaneously. This allows each turntable 304 to be rotated simultaneously. Thus, the indexing motor 308 can determine the position of each turntable 304, to allow selective engagement of the output gears 314 on each layer.

The multi-layer, multi-output transmission 300 shown in FIGS. 3A-3E can include any desired number of idler gears 312 and output gears 314 on each layer 305. As with the other embodiments discussed above, the output gears 314 are rotatably mounted to their respective bases 302 and arranged in a circle around the respective turntable 304. The output gears 314 can be mounted on common axles 315 that provide vertical posts to separate and support the adjacent bases 302 and intermediate plates 303. The vertical posts 315 provide the vertical separation between layers 305 that provides a suitable space for rotation of the gears on each layer. These common axles 315 can also be configured to cause all vertically aligned output gears 314 to rotate together. For example, the axles 315 can be a square-shaped shaft, which locks to each output gear 314 in a given vertical alignment, so that these gears behave as one gear, regardless of their level.

The multiple idler gears 312 on each layer are rotatably mounted on their respective turntables 304 and engaged with their respective drive gear 310. As with the embodiment of FIGS. 2A-2E, these idler gears 312 can be vertically indexed in each layer to provide a desired spacing and positioning of the idler gears 312 and to allow various settings in which some idler gears 312 on any given layer 305 are engaged and some are not, and some output gears 314 on any given layer 305 are driven and some are not.

Figure 3D:
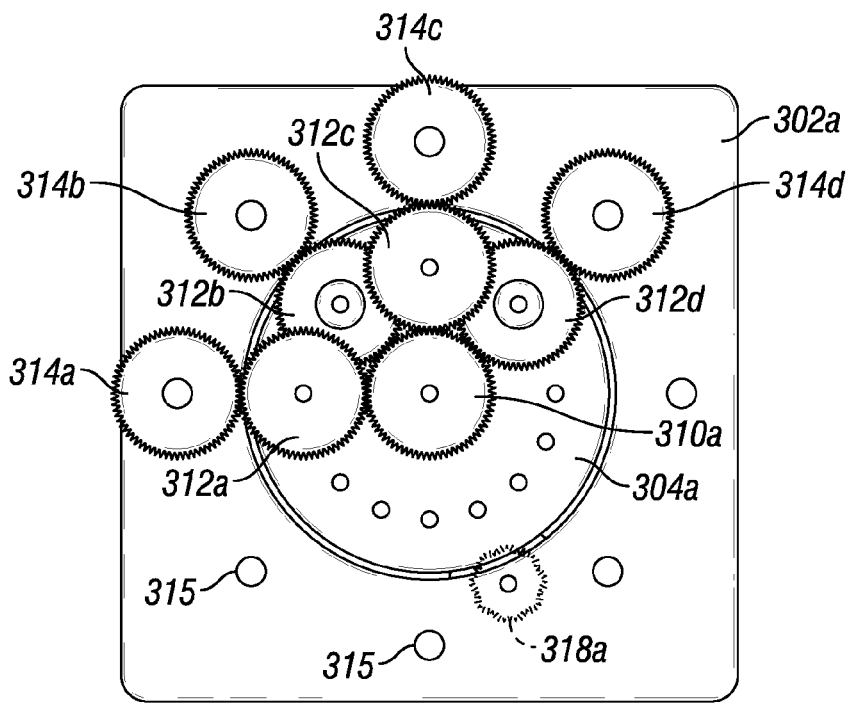
FIGS. 3D-3F are top views that show each of three different layers of the multi-layer multi-output indexing transmission of FIG. 3A, each layer having its gear train positioned in one of many different output configurations.
Figure 3E:
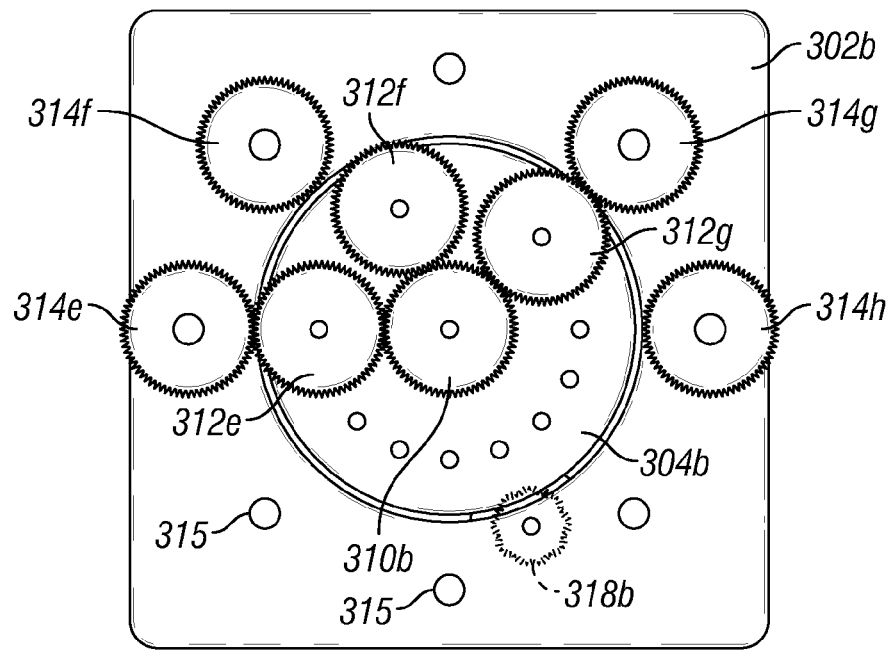
Figure 3F:
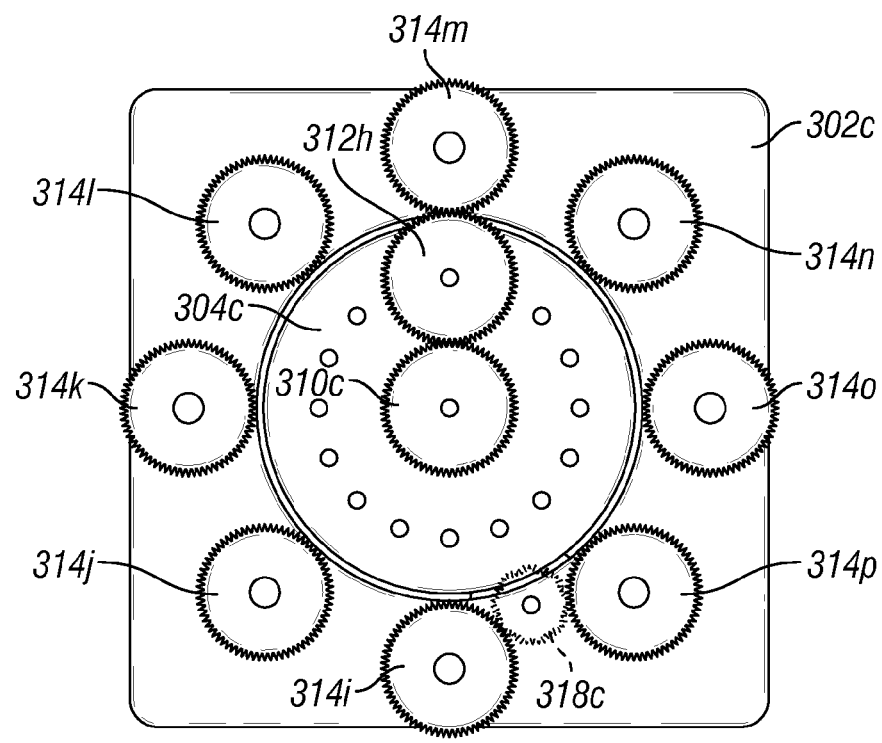

Provided in FIGS. 3D-3F are three cross-sectional views that show each of the three different layers 305 of the multi-layer multi-output indexing transmission 300. In these views, each layer 305 has its gear train positioned in one of many different possible output configurations. In the view of FIG. 3D, the first layer 305a is shown. In this layer 305a, the drive gear 310a is engaged with four idler gears 312a-312d, which are engaged with four output gears 314a-314d, respectively. In this layer at this position, rotation of the drive gear 310a will cause simultaneous rotation of all four of the output gears 314a-314d in the same direction. It is to be appreciated that if the first turntable 304a is rotated to any position other than that shown, by action of the indexing motor 308, some lesser number of these output gears 314a-314d will rotate. Indeed, with this configuration any combination of one, two, three or four drive gears 314a-314d can be powered, and the first turntable 304a can be rotated to a position at which there are no output gears 314 that are engaged.

A top view of the second layer 305b is shown in FIG. 3E. This layer includes a drive gear 310b that is engaged with three idler gears 312e-312g, which are mounted upon the second turntable 304b and positioned for selective engagement with four output gears 314e-314h, respectively. In this layer at this position, the first idler gear 312e is engaged with the first output gear 314e, the second idler gear 312f is not engaged with any output gears, and the third idler gear 312g is engaged with the third output gear 314g. In this configuration, rotation of the drive gear 310b will cause simultaneous rotation of the first and third output gears 314e and 314g in the same direction. When the second turntable 304b is rotated to some position other than that shown, by action of the indexing motor 308, some different combination of output gears 314 can be caused to rotate. Specifically, any of the output gears 314e-314h can be driven individually (e.g. when aligned with idler gear 312f), or any two of the four output gears can be driven in conjunction. Like the configuration of the first layer 305a, shown in FIG. 3D, the idler gears 312 of the second layer 305b can also be rotated to a position at which there are no output gears 314 that are engaged.

A top view of the third layer 305c is shown in FIG. 3F. This layer includes a drive gear 310c that is engaged with a single idler gear 312h, which is mounted upon the third turntable 304c and positioned for selective engagement with any one of eight output gears 314i-314p, respectively. In this layer at this position, the idler gear 312h is engaged with the fifth output gear 314m, and rotation of the drive gear 310c will cause simultaneous rotation of only this sixth output gear 314m in the same direction. In this layer each output gear 314 is driven independently of the others. As with the other layers, when the third turntable 304c is rotated to some position other than that shown, by action of the indexing motor 308, the idler gear 312h can be moved to engage any one of the other output gears 314i-314p, or it can be moved to some intermediate position in which it does not engage any output gears 314.

The multi-layer multi-output indexing transmission 300 shown in FIGS. 3A-3F advantageously provides a unique turntable 304 and set of idler gears 312, along with a unique set of output gears 314 on each layer 305. The multi-layer configuration thus multiplies the number and variety of outputs that can be obtained from a single input, while keeping the mechanism compact and simple. Depending on the desired number of outputs, any number of layers can be provided. This allows an almost limitless combination of simultaneous power outputs from only two motors. In addition to the variation within each layer, the output gears can be offset from one layer to the next to enable maximum flexibility from a minimum number of inputs. The figures show only a few examples of many possible configurations, and the actual design can have as many or few combinations as desired.

It is also to be appreciated that a synchro-mesh bypass feature, as discussed above, can also be associated with the multi-output transmission embodiment shown in FIGS. 3A-3F. In the absence of such a system, the output gears 314 of each layer 305 in the entire multi-layer stack could be driven at the same time as the turntables 304 rotate. By maintaining a consistent ratio between the speed of the indexing motor 308 and the speed of the drive motor 306, the electronically controlled synchro-mesh system can provide smooth operation of all layers 305, and prevent tooth-to-tooth jamming.

Another embodiment of a multi-output indexing transmission is shown in FIGS. 4A-4H. This embodiment of a multi-output indexing transmission 400 uses a single motor 406 for both drive and for the indexing turntable 404. Viewing FIGS. 4A and 4B, the transmission 400 generally includes a base 402, a turntable 404, a drive motor 406, a drive gear 410 at the center of the turntable, one or more idler gears 412 rotatably mounted upon the turntable and one or more output gears 414a-b rotatably attached to the base 402.

Unlike the embodiments described above, the drive motor 406 is mounted off-center with respect to the turntable 404, and has a drive shaft 422 with a first motor gear 424 at its distal end. The first motor gear 424 is engaged with a moveable gear 430 that is attached at the end of a pivot arm 432. The moveable gear 430 is configured to selectively transmit rotation of the first motor gear 424 to a lower center gear 428 that is positioned below and coaxial with the turntable 404, or to an indexing gear 418, which is rotatably mounted to the underside of the base 402 and in engagement with the outer teeth 420 of the turntable 404. The lower center gear 428 is attached to a shaft (not shown) that extends through the center of the turntable 404 and powers the drive gear 410.

Instead of a separate indexing motor, in the configuration of FIGS. 4A-H the pivot arm 432 and moveable gear 430 allow selective engagement of either the turntable 404 or the drive gear 410, and operate similar to the manner of turn-and-reverse motor systems, so that the drive motor 406 performs both the drive and indexing functions. The pivot arm 432 pivots about the drive shaft 422 in response to friction between the drive shaft 422 and the pivot arm 432. The pivot arm 432 has a range of motion that is mechanically restricted, so that when the drive motor 406 rotates in one direction the pivot arm 432 rotates in that direction to one extreme of its motion, and when the drive motor 406 rotates in the opposite direction the pivot arm 432 rotates in that direction to the other extreme of its motion.

Figure 4A:
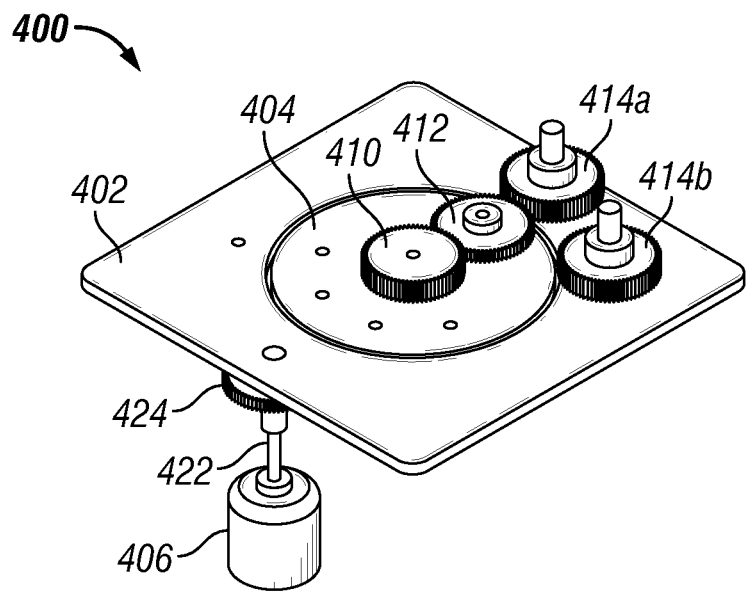
FIG. 4A is a top perspective view of an embodiment of a 1 motor input, multi-output indexing transmission having multiple output gears.
Figure 4B:
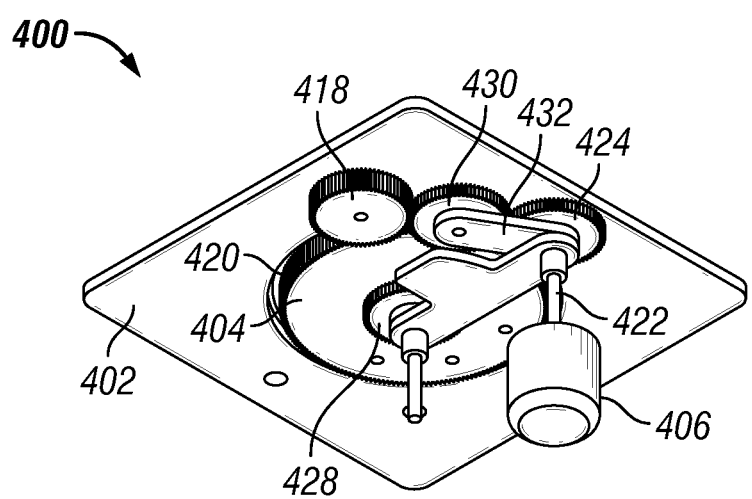
FIG. 4B is a bottom perspective view of the single motor, multi-output indexing transmission of FIG. 4A.

One extreme end of the motion of the pivot arm 432 is shown in FIG. 4B. In this position, the pivot arm 432 has rotated counter clockwise (in this view) in response to counter-clockwise rotation of the motor 406, to a point at which the moveable gear 430 is engaged with the indexing gear 418. The counter-clockwise direction of rotation of the pivot arm 432 keeps the pivot arm against a mechanical stop, and maintains gear engagement. Since the moveable gear 430 is engaged with the first motor gear 424, and the indexing gear is engaged with the turntable 404, this position will cause rotation of the turntable 404. It will be apparent that since the first motor gear 424 is rotating counter-clockwise in this position, the turntable 404 will rotate clockwise. This configuration allows the drive motor 406 to determine the position of the turntable 404, to allow selective engagement of the output gears 414, in the manner discussed above. Once the turntable 404 has rotated a desired amount, the drive motor 406 can be returned to clockwise rotation, which will cause the pivot arm 432 to rotate clockwise and cause the moveable gear 430 to disengage and move away from the indexing gear 418. When the pivot arm 432 rotates to its clockwise extreme, the moveable gear 430 will engage with the lower center gear 428, and commence driving the drive gear 410.

Figure 4C:
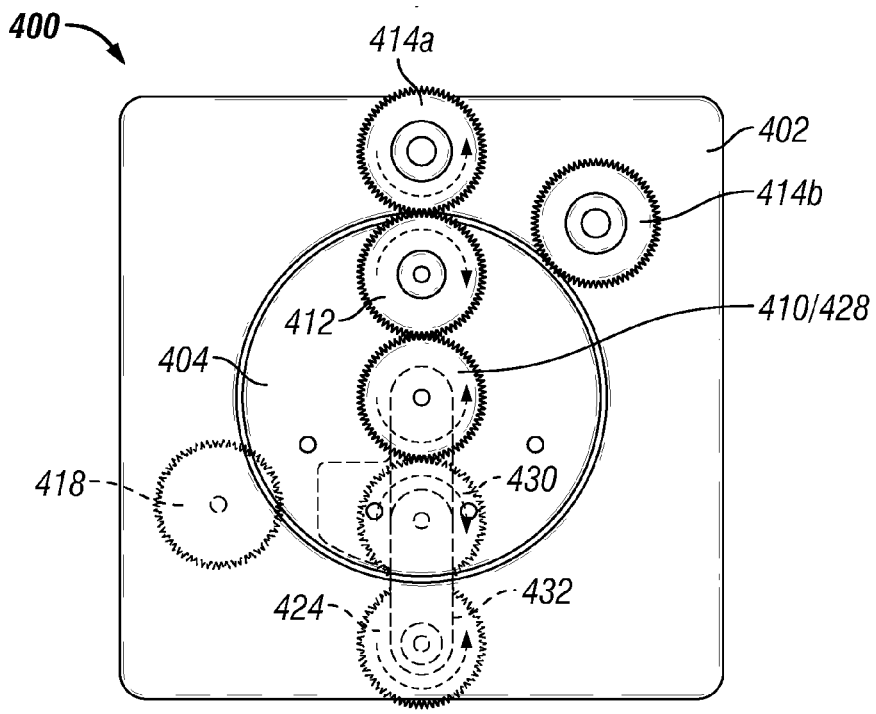
FIGS. 4C-4H are sequential top views showing the single motor multi-output indexing transmission of FIG. 4A transitioning from driving a first output gear to driving a second output gear.

An illustration of the operation of this multi-output transmission 400 is shown in the sequence of views in FIGS. 4C-4H. It is to be understood that the views of FIGS. 4C-4H are from an opposite perspective compared to FIG. 4B, so that described rotational directions are opposite to those indicated above, simply due to the change in perspective. As shown in FIG. 4C, the drive motor 406 is driving the first motor gear 424 counter-clockwise, which drives the moveable gear 430, which transmits rotation to the lower center gear 428, which powers the drive gear 410 counterclockwise. The idler gear 412 is engaged with the drive gear 410 and thus delivers power to the first output gear 414a and rotates this gear counter-clockwise. In this configuration, the pivot arm 432 bearing the movable gear 430 is rotated away from the indexing gear 418, and the counterclockwise rotation of the first motor gear 424 keeps the pivot arm 432 biased toward this position.

Figure 4D:
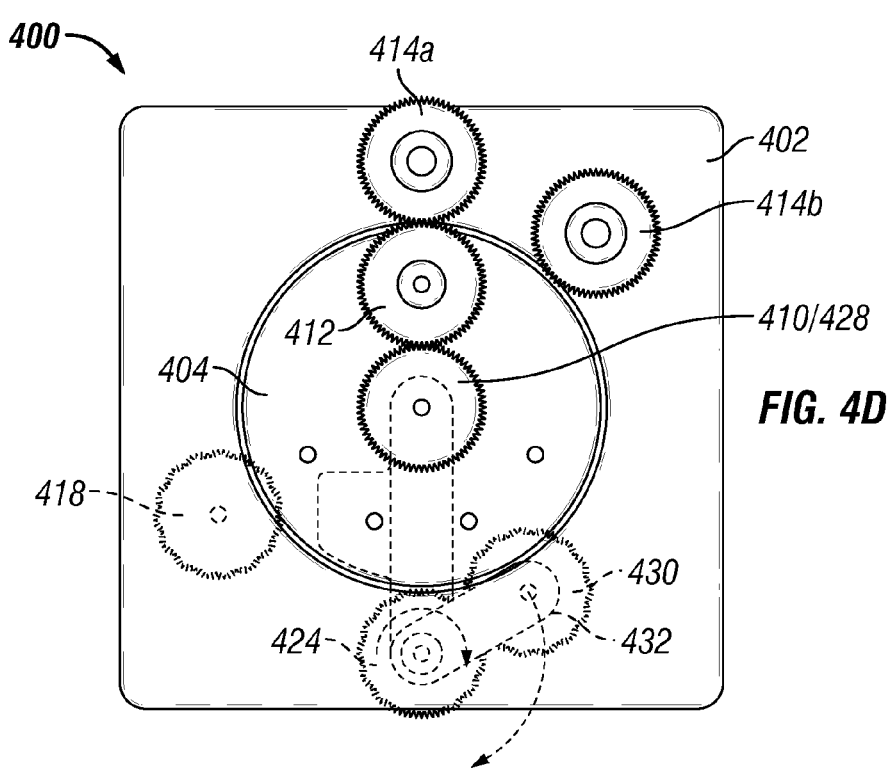
Figure 4E:
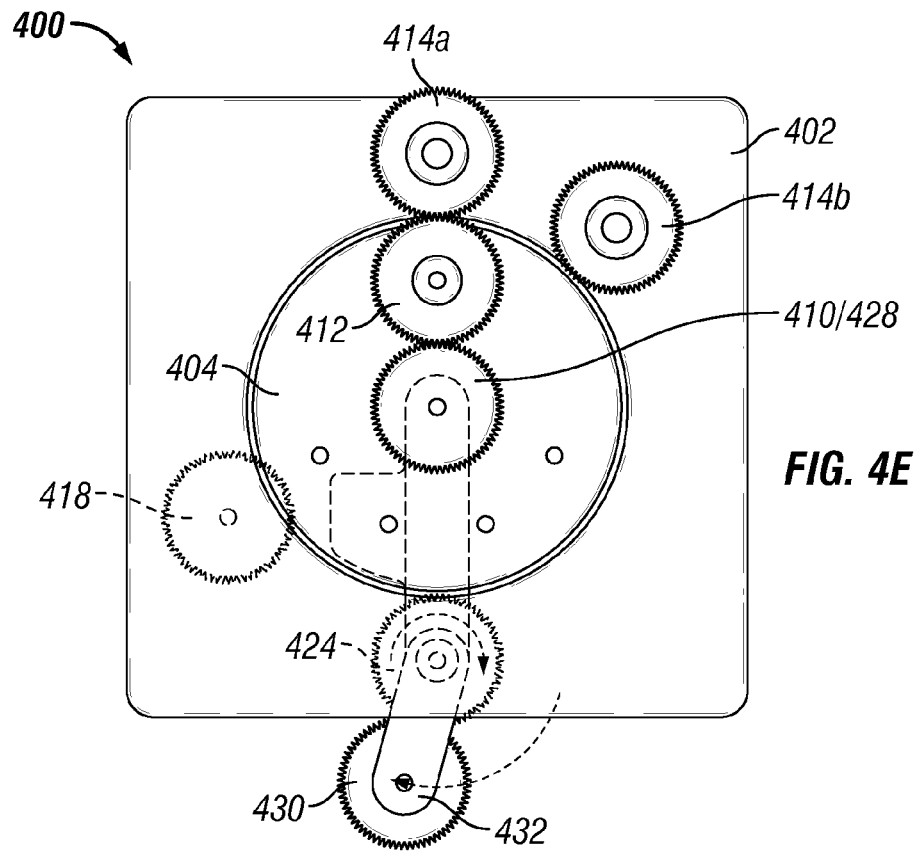
Figure 4F:
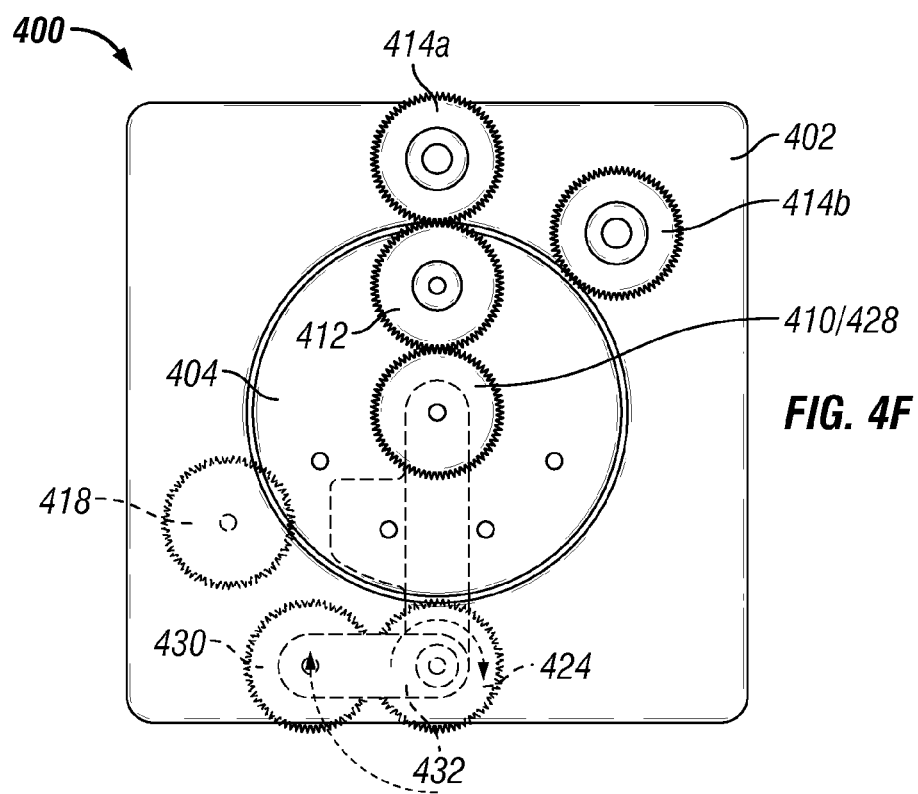
Figure 4G:
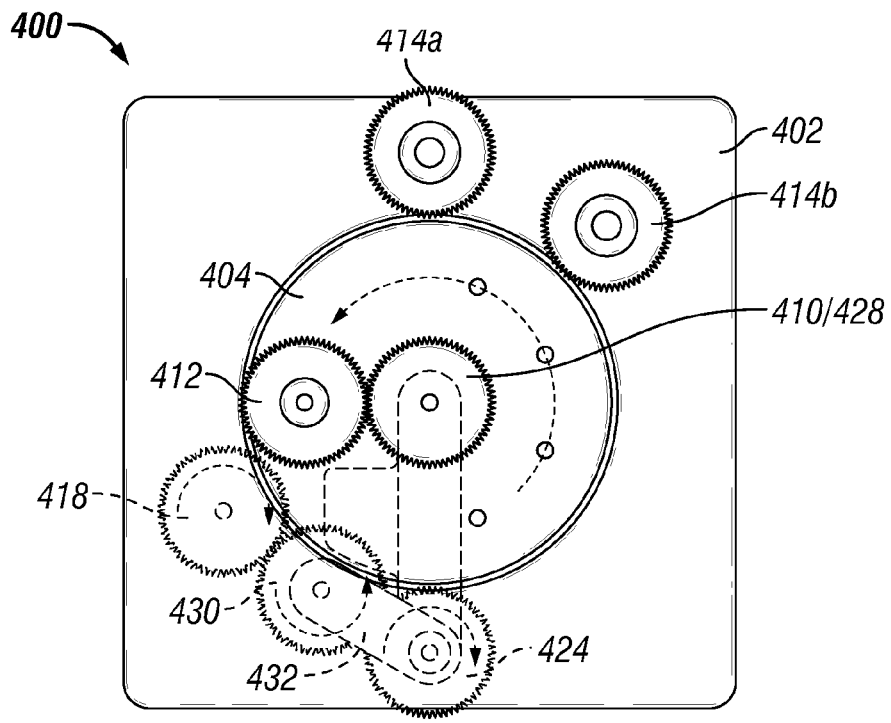
Figure 4H:
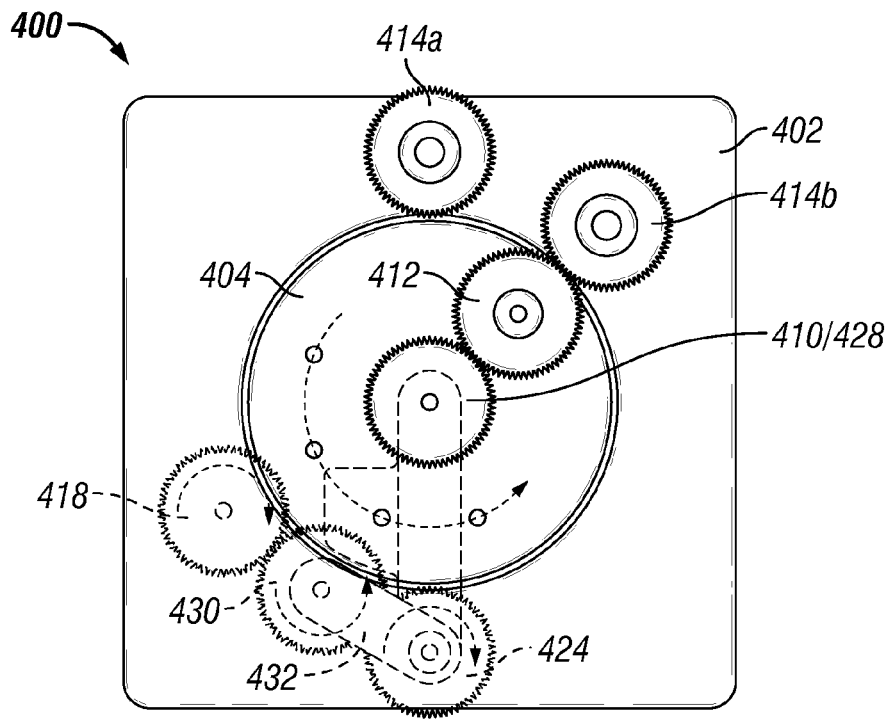

When it is desired to rotate the turntable 404 to move the idler gear 412 to a different position, the drive motor 406 is reversed to clockwise rotation, which causes the pivot arm 432 to begin to rotate clockwise, as indicated by arrow 436 in FIG. 4D, and thus draws the moveable gear 430 out of engagement with the lower center gear 428 and thus stops driving of the drive gear 410. The pivot arm 432 continues to rotate as shown in FIGS. 4E and 4F, until it reaches the position shown in FIG. 4G, where further rotation of the pivot arm 432 is mechanically prevented. At this point, the moveable gear 430 engages with the indexing gear 418, and causes the turntable 404 to rotate counter-clockwise, rotating the idler gear 412 out of engagement with the first output gear 414a as shown in FIG. 4G. Continued rotation of the turntable 404 brings the idler gear 412 into alignment with the second output gear 414b, as shown in FIG. 4H.

At this point the drive motor 406 can be reversed again, causing the pivot arm 432 to rotate counter-clockwise and draw the moveable gear 430 out of engagement with the indexing gear 418, and eventually back to the position shown in FIG. 4C, wherein the moveable gear 430 will again engage the lower center gear 428 and thus power the drive gear 410, thus engaging the second output gear 414b in counter-clockwise rotation.

It is to be understood that the single-motor multi-output transmission 400 shown in FIGS. 4A-4H can be configured for any number of output gears, and is not limited to the two-gear configuration that is shown. It is also to be understood that other variations discussed above with respect to the other embodiments, such as gears of different sizes, vertically indexed idler gears, etc., can also be applied to the single-motor multi-output transmission embodiment.

Additionally, the single-motor multi-output transmission configuration shown in FIGS. 4A-4H can be applied to a multi-layer, multi-output transmission like that shown in FIGS. 3A-3F. In such an embodiment, each layer would have its own indexing gear, the indexing gears being rotatably attached below the respective base for the given layer, and engaged to rotate the respective turntable. The indexing gears for all of the layers can be interconnected along a common indexing drive shaft, so that they rotate simultaneously. In such a configuration, the first position of the pivot arm would be the same as described above, a position in which the moveable gear simultaneously drives the plurality of drive gears, while the second position of the pivot arm would engage the moveable gear with one of the indexing gears, presumably the one on the lowest layer, so as to simultaneously rotate the plurality of turntables.

The disclosure thus provides a multiple-output transmission that can drive and select multiple output shafts individually or in a plurality of combinations via an indexing mechanism. The multiple-output transmission can operate with one motor that performs both the drive and indexing functions, or it can have separate drive and indexing motors. The multiple-output transmission can be arranged in a stack, providing multiple layers of selectively drivable output gear groups that allow a wide range of output combinations from a single drive source.

It is to be understood that the above-referenced arrangements are illustrative of the application of the principles of the present invention. It will be apparent to those of ordinary skill in the art that numerous modifications can be made without departing from the principles and concepts of the invention as set forth in the claims, which are presented herein.

What is claimed is:

1. A multiple-output transmission, comprising:
   a first turning mechanism, adapted to bi-directionally rotate about a first axis;
   a first drive gear, disposed adjacent to the first turning mechanism and adapted to rotate about a second axis that is at least parallel to the first axis;
   a drive motor, configured to drive the first drive gear;
   a plurality of first idler gears, rotatably disposed upon the first turning mechanism and engaged with the first drive gear;
   a plurality of first output gears, each first idler gear being positioned to engage one of the plurality of first output gears when the first turning mechanism rotates to one of multiple selectable indexing positions, the plurality of first output gears being selectively driven in multiple combinations depending on the selected indexing position; and
   an indexing mechanism, configured to selectively rotate the first turning mechanism in either direction between the indexing positions.

2. The multiple-output transmission of claim 1, wherein the plurality of first idler gears are axially indexed, whereby a selected first idler gear of the plurality of first idler gears can have a no-contact overlapping relationship with an adjacent first idler gear of the plurality of first idler gears.

3. The multiple-output transmission of claim 1, wherein the turning mechanism comprises a turntable.

4. The multiple-output transmission of claim 1, wherein the indexing mechanism comprises:
   an indexing gear, engaged to rotate the turning mechanism;
   an indexing motor, engaged with the indexing gear, configured to selectively rotate the indexing gear.

5. The multiple-output transmission of claim 4, wherein the turning mechanism comprises a turntable, and the indexing gear is engaged with gear teeth disposed upon a perimeter of the turntable.

6. The multiple-output transmission of claim 1, wherein the indexing mechanism comprises:
   an indexing gear, engaged to rotate the first turning mechanism;
   a pivot arm, attached to a drive shaft of the drive motor adjacent to the first turning mechanism; and
   a moveable gear, attached to the pivot arm and engaged with the drive motor, the pivot arm being rotatable between a first position in which the moveable gear is engaged to drive the first drive gear, and a second position in which the moveable gear is engaged with the indexing gear to rotate the turning mechanism.

7. The multiple-output transmission of claim 6, wherein the pivot arm is in frictional contact with the drive shaft, whereby the pivot arm pivots in a first direction when the drive motor rotates in a first direction, and pivots in a second direction when the drive motor rotates in a second direction.

8. The multiple-output transmission of claim 1, further comprising:
   a second turning mechanism, positioned substantially parallel to the first turning mechanism, and adapted to rotate about the first axis;
   a second drive gear, coaxially aligned with and disposed adjacent to the second turning mechanism, and configured to be driven by the drive motor;
   a second idler gear, rotatably disposed upon the second turning mechanism and engaged with the second drive gear;
   a plurality of second output gears, positioned to engage with the second idler gear when the second turning mechanism rotates to one of the multiple selectable indexing positions, the indexing mechanism being configured to simultaneously selectively rotate the first and second turning mechanisms between the multiple selectable indexing positions.

9. The multiple-output transmission of claim 1, further comprising a controller, coupled to the drive motor and the indexing mechanism, configured to cause the drive motor to rotate at a synchro-mesh rate while the first turning mechanism rotates between the multiple selectable indexing positions, until the first turning mechanism rotates to a selected one of the indexing positions.

10. A multiple-output transmission, comprising:
    a plurality of turntables, disposed substantially parallel to each other in a stacked relationship, each turntable adapted to rotate about a common first axis;
    a plurality of drive gears, each drive gear coaxially positioned adjacent to one of the plurality of turntables;
    a drive motor, configured to simultaneously drive the plurality of drive gears;
    a plurality of idler gears, at least one idler gear rotatably supported by each of the turntables and engageable with the respective drive gear;
    a plurality of output gears, at least one output gear positioned to engage with one of the idler gears of one of the turntables when the respective turntable rotates to one of multiple selectable indexing positions; and
    an indexing mechanism, configured to selectively simultaneously rotate the turntables between the indexing positions.

11. The multiple-output transmission of claim 10, further comprising a controller, coupled to the drive motor and the indexing mechanism, configured to cause the drive motor to rotate at a synchro-mesh rate while the plurality of turntables rotate between the multiple selectable indexing positions, until the plurality of turntables rotate to a selected one of the indexing positions.

12. The multiple-output transmission of claim 10, wherein the indexing mechanism comprises:
    a plurality of indexing gears, each engaged to rotate one of the turntables; and
    an indexing motor, engaged with the plurality of indexing gears, configured to simultaneously rotate the turntables.

13. The multiple-output transmission of claim 12, wherein at least one of the drive motor and the indexing motor are reversible.

14. The multiple-output transmission of claim 12, further comprising a drive shaft, extending from the indexing motor to drive all of the indexing gears.

15. The multiple-output transmission of claim 10, wherein the indexing mechanism comprises:
- a plurality of indexing gears, interconnected by an indexing drive shaft to rotate simultaneously, each indexing gear engaged to rotate one of the turntables;
- a pivot arm, attached to a drive shaft of the drive motor; and
- a moveable gear, attached to the pivot arm and engaged with the drive motor, the pivot arm being rotatable between a first position in which the moveable gear is engaged to simultaneously drive the plurality of drive gears, and a second position in which the moveable gear is engaged with one of the indexing gears to simultaneously rotate the plurality of indexing gears and the plurality of turntables.

16. The multiple-output transmission of claim 10, wherein at least some of the plurality of idler gears are axially indexed, whereby a selected idler gear of the plurality of idler gears can have a no-contact overlapping relationship with an adjacent idler gear of the plurality of idler gears.

17. A multiple-output transmission comprising:
- a drive motor;
- multiple stacked layers, each layer comprising:
    1) one or more output gears;
    2) a drive gear, coupled to be driven by the drive motor; and
    3) at least one idler gear, engageable with the drive gear; and
- means for bi-directionally indexing the at least one idler gear of each layer between multiple selectable indexing positions, the indexing positions selectively engaging the at least one idler gear of any layer of the multiple stacked layers with at least one of the one or more output gears of the same layer.

18. The multiple-output transmission of claim 17, wherein the means for indexing the at least one idler gear of each layer comprises each layer having:
- a turning mechanism, the at least one idler gear being rotatably disposed upon the turning mechanism and the one or more output gears being arranged around a perimeter of the turning mechanism; and
- an indexing gear, selectively engageable to rotate the turning mechanism between the multiple indexing positions.

19. The multiple-output transmission of claim 18, wherein the means for indexing the at least one idler gear of each layer further comprises an indexing motor, engaged to simultaneously selectively rotate the indexing gear corresponding to each layer.

20. The multiple-output transmission of claim 18, further comprising: a pivot arm, coupled to the drive motor, configured to selectively pivot to engage the drive gear or one of the indexing gears, depending upon a direction of motion of the drive motor.

21. The multiple-output transmission of claim 17, further comprising a controller, coupled to the drive motor and the means for indexing the at least one idler gear of each layer, configured to cause the drive motor to rotate the at least one idler gear of each layer at a synchro-mesh rate when indexing the at least one idler gear of each layer between the indexing positions.

22. The multiple-output transmission of claim 17, wherein the at least one idler gear of each layer is part of a plurality of idler gears associated with each layer, at least some of the plurality of idler gears associated with each layer being axially indexed, whereby within each layer a selected idler gear of the plurality of idler gears can have a no-contact, overlapping relationship with an adjacent idler gear of the plurality of idler gears.

\* \* \* \* \*